United States Patent [19]

Danieli

[11] Patent Number: 5,152,263

[45] Date of Patent: Oct. 6, 1992

[54] BEARING AND RETENTION APPARATUS FOR A CAMSHAFT PHASE CHANGE DEVICE

[75] Inventor: Oscar G. Danieli, Battle Creek, Mich.

[73] Assignee: Eaton Corporation, Cleveland, Ohio

[21] Appl. No.: 775,670

[22] Filed: Oct. 11, 1991

[51] Int. Cl.⁵ .............................................. F01L 1/34
[52] U.S. Cl. .............................. 123/90.17; 123/90.31; 464/2
[58] Field of Search ............... 123/90.15, 90.17, 90.31; 464/2

[56] References Cited

U.S. PATENT DOCUMENTS

| | | | |
|---|---|---|---|
| 4,754,727 | 7/1988 | Hampton | 123/90.17 |
| 4,841,924 | 6/1989 | Hampton et al. | 123/90.31 |
| 5,031,585 | 7/1991 | Muir et al. | 123/90.17 |
| 5,078,647 | 1/1992 | Hampton | 123/90.17 |

FOREIGN PATENT DOCUMENTS 3438088  4/1986  Fed. Rep. of Germany ... 123/90.15
212616  9/1986  Japan ............................. 123/90.17

Primary Examiner—E. Rollins Cross
Assistant Examiner—Weilun Lo

[57] ABSTRACT

A combination bearing and apparatus for maintaining the relative axial location of the input and output members of a camshaft phase change device. Peripheral grooves are formed in the members to receive a plurality of balls which support the input member for rotation on the output member. Radial slots are formed in the output member for insertion of the balls, and the angular position of the balls is maintained by fingers formed on a retention member which has spoke members received in the slots, and which is held in engagement with the output member by a retaining ring.

8 Claims, 3 Drawing Sheets

BEARING AND RETENTION APPARATUS FOR A CAMSHAFT PHASE CHANGE DEVICE

This invention relates to a device for varying the angular phase relation between two rotating shafts. More specifically, the invention relates to such a device adapted to vary the angular phase relation between the crankshaft and a camshaft of an internal combustion engine.

Devices for varying or changing the angular phase relation or timing between an engine camshaft and crankshaft are well known, as may be seen by reference to U.S. Pat. No. 5,031,585 which is assigned to the assignee of this patent and which is incorporated herein by reference.

U.S. Pat. No. 5,031,585 to Muir, et al discloses a device wherein an axially displaceable advancing plate drivingly interconnects input and output members through angled or helical surfaces formed on interfacing portions of such input and output members. The advancing plate is also threadably mounted on a drum for axial displacement along the drum in response to relative rotation between the drum and plate. Relative rotation in one direction is provided by a spring reacting between the hub and drum, and in the other direction by selective actuation of a brake to retard the rotation of the drum counter to the spring force.

In the above prior art device the input member has a first set of lugs formed thereon which interfit with a first set of slots formed in the advancing member, and the output member has a second set of lugs formed thereon which interfit with a second set of slots formed in the advancing member. The first lugs and slots are formed with straight interfitting surfaces such that a constant angular relationship is maintained between the input and the advancing member as the advancing member moves axially with respect to the input. The second lugs and slots are formed with angled interfitting surfaces such that the angular relationship between the advancing member and the output member varies as the advancing member moves axially with respect to the output. In accordance with other prior art devices of similar type, both sets of lugs and slots can be formed with angled surfaces, which is effective to increase the degree of angular displacement between the input and output members. Also in accordance with the prior art, the angled interfitting surfaces of the lugs and slots can be helical.

While the prior art designs are functionally satisfactory, a great deal of precision is required in forming the interfitting lug and slot surfaces resulting in relatively high manufacturing costs.

In accordance with the present invention, the construction of the phase change device is significantly simplified, and the manufacturing costs significantly reduced by replacing the lug and slot engagement surfaces with interfitting grooves and balls. Since the grooves can be easily formed in an angular or helical pattern quite simply using currently known machinery techniques, and since very precisely formed, hardened balls, such as those used in antifriction bearings are readily available "off the shelf", the present invention permits the construction of a phase change device functionally equivalent to prior art devices, but manufacturable at a significantly reduced cost.

An additional advantage resulting from the present invention is that the high precision of the available bearing balls permits the device to be constructed with very tightly controlled clearances. This results in reduced lash within the mechanism, which results in a significant reduction in the operational noise level of the device.

The use of such groove and ball construction in other areas of the phase change structure also results in other cost saving advantages, specifically in replacing a snap ring and groove retention of certain components with a ball and groove design.

Other objects and advantages of the invention will be apparent from the following description when considered in connection with the accompanying drawings, wherein.

Figure 1:
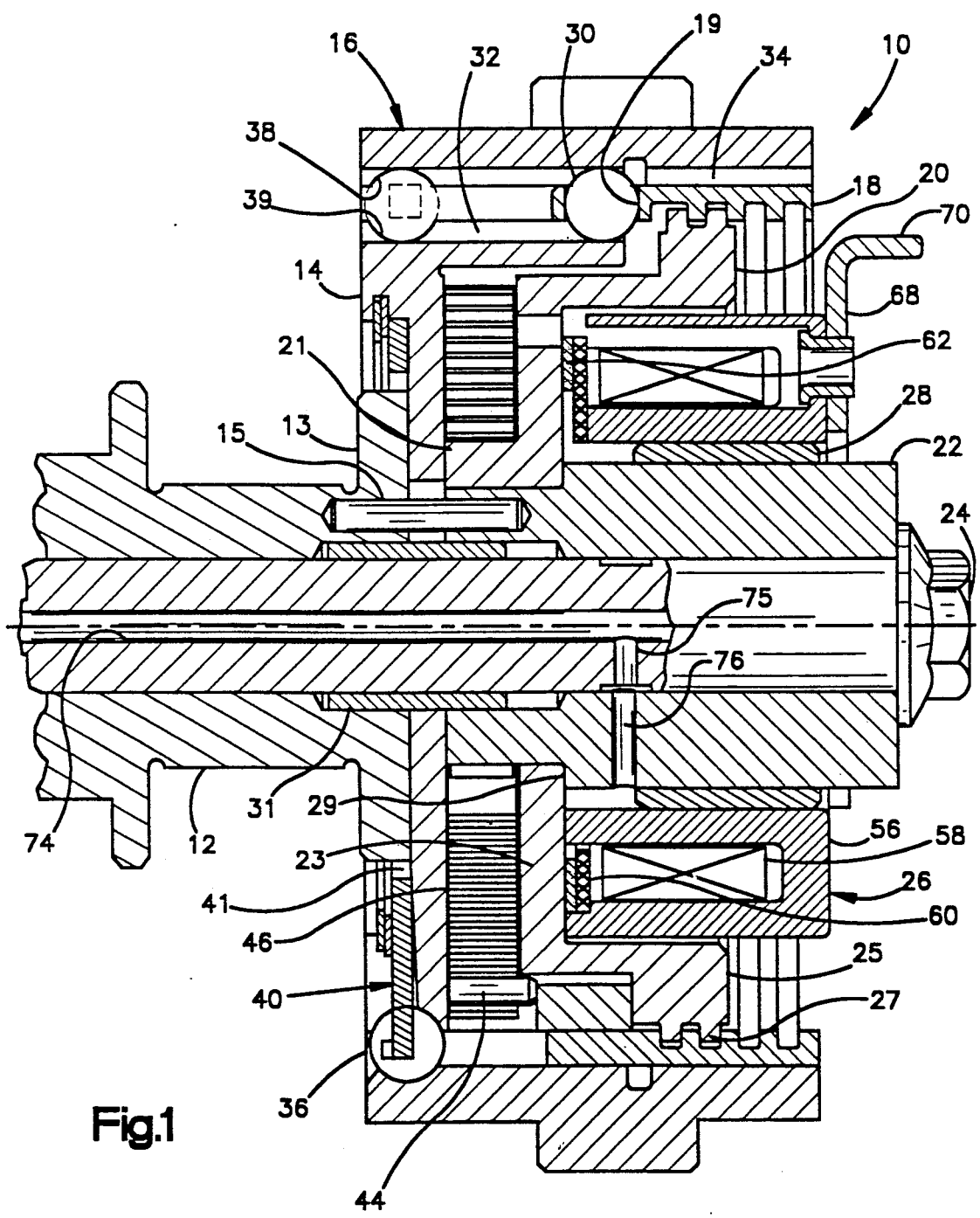
FIG. 1 is a cross-sectional view of a phase change device incorporating the invention.

Referring to the drawings, there is illustrated an angular phase change device 10 adapted to be fixed to and rotate about a camshaft 12 of an internal combustion engine (not shown). As is well known in the art the engine includes a crankshaft which rotates the device 10 and camshaft 12. The camshaft controls the opening and closing of the intake and/or exhaust valves of the engine in known manner. Device 10 includes a hub 14 mounted for rotation with the camshaft 12; a drive member 16 which is driven by the engine crankshaft, or by another camshaft in the case of a twin cam engine, and which is engaged with the hub 14 in a variable phase relationship therewith; an advancing plate 18 which interconnects the drive member 16 and the hub 14; a drum 20 threadedly engaged with the advancing plate and which when subjected to a retarding force is operable to effect axial movement of the advancing plate, which movement effects a change in the phase relationship between the drive member and the hub as will be described in detail below; and a stationary brake assembly 26 which is supported on the shaft member 22 on a bearing 28 and which is operable to apply the retarding force to the drum. The drum is supported for rotation on a shaft 22 which is attached to the camshaft 12 by means of a threaded fastener 24. A bushing 31 spans the end of the camshaft the hub and the shaft.

The hub 14 is an essentially annular member having a radially extending portion located against a flange 13 formed on the camshaft 12 and is fixed for rotation with the camshaft by the shaft 22 and fastener 24. A dowel pin 15 received through a hole in the flange 13 and a slot in the hub 14 maintains timing between the camshaft and the hub. As will be described in more detail below the hub 14 and the advancing plate 18 are drivingly interconnected by means of balls 30 carried by the advancing plate and received in helical grooves 32 formed in the hub.

The drive member 16 is the input to the phase change device 10, and is illustrated herein as a gear, although it can be appreciated that the input can also be a sprocket or a pulley. The drive member 16 is supported on the hub for limited relative rotation therewith by means of a second set of balls 36 received in peripheral grooves 38 and 39 formed in the drive member and hub respectively, and retained by a retainer 40, the balls 36 also serving to retain the relative axial positions of the drive member and hub, as will be described in detail below.

The drive member 16 also includes helical grooves 34 which engage the balls 30.

The drum 20 comprises an axially extending portion 21 mounted for rotation on the shaft 22, a radially extending portion 23 which also functions as a brake disc, and a drum portion 25 which has external threads 27 formed thereon in engagement with corresponding internal threads formed on the advancing plate 18. The axial position of the drum 20 relative to the hub 14 is maintained by the dimension between the hub and lip 29 formed on the shaft 22 when the shaft is bottomed out against the hub as shown in FIG. 1.

Figure 2:
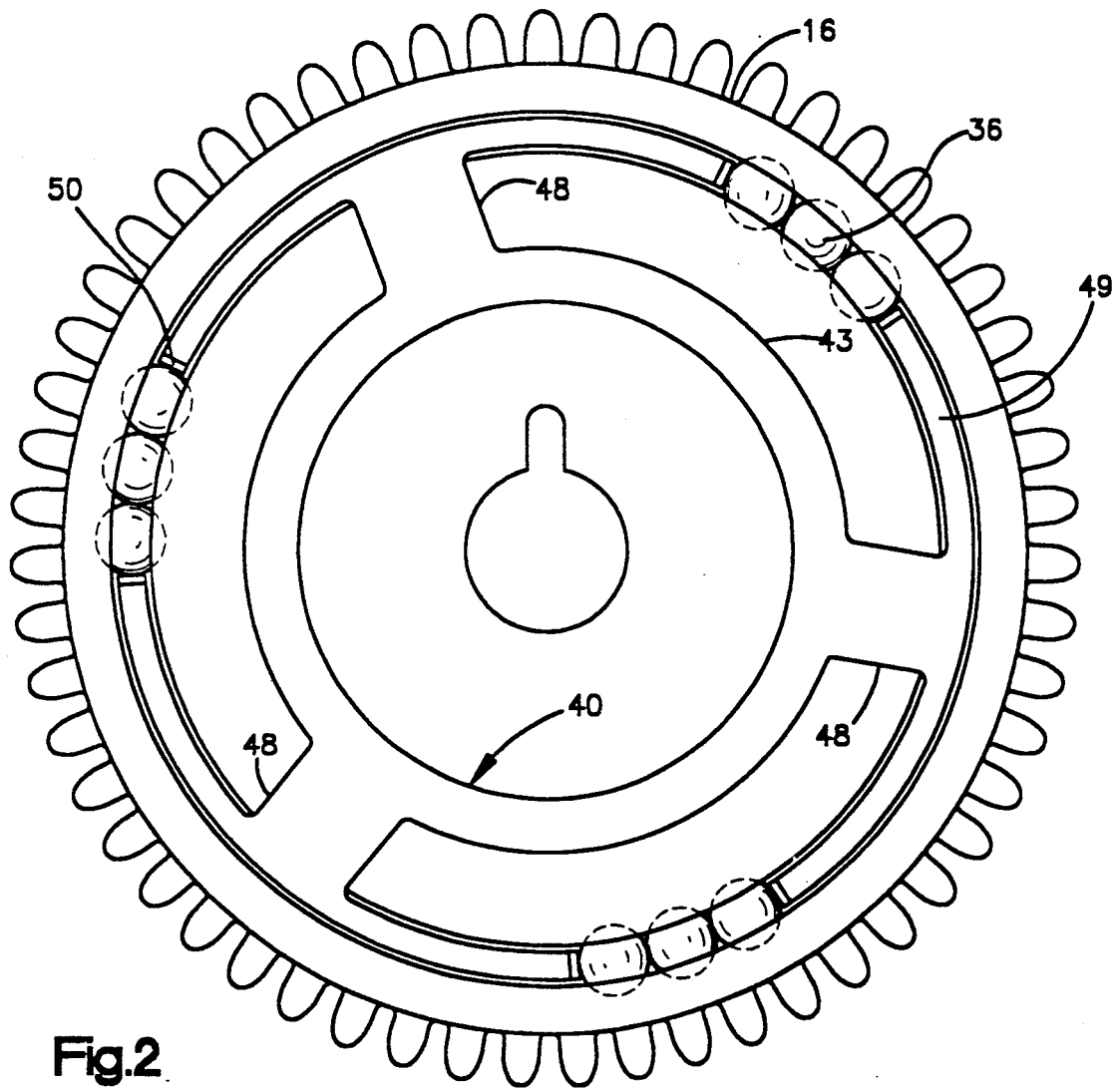
FIG. 2 is a rear elevation view of the device of FIG. 1.
Figure 3:
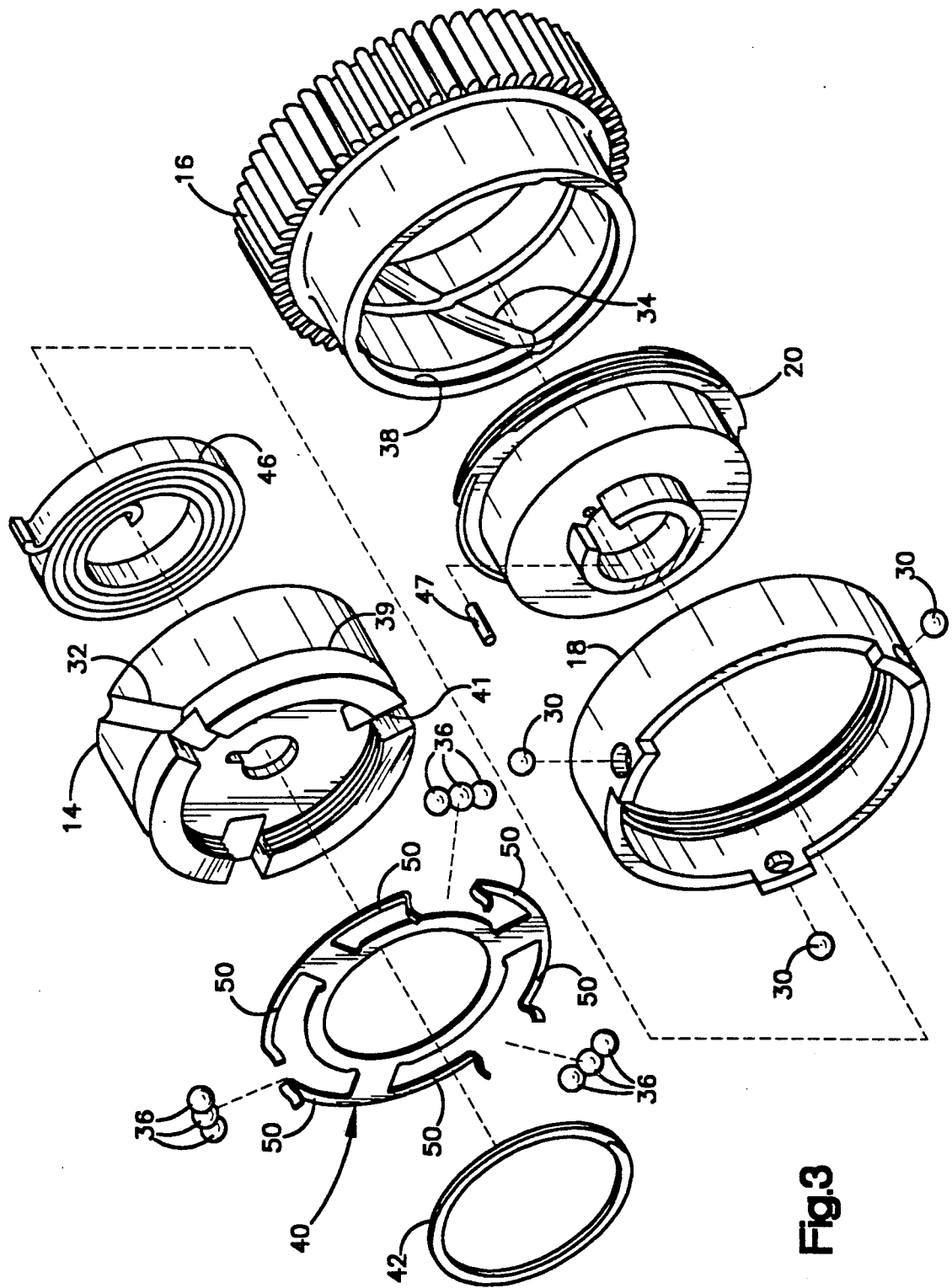
FIG. 3 is an exploded view of a portion of the device shown in FIG. 1.

In accordance with the known operation of the phase change device, the axial movement of the advancing plate 18 which results in relative angular rotation between the drive member 16 and the hub 14 is produced by retarding the rotation of the drum 20 with respect to the hub 14. Referring particularly to FIGS. 1, 2 and 3, the drum 20 and the hub 14 are interconnected by a clockspring 46 which is hooked over a pin 44 received in the hub and which is attached to the drum by means of a pin 47 received in the drum, the clockspring biasing the drum relative to the hub in the position illustrated by FIG. 1, wherein the advancing plate 18 is advanced along the threads 27 to its righwardmost position relative to the drum 20, the drive member 16 and the hub 14.

For purposes of illustration the relative positions of the various elements shown in the drawings are considered to represent a base or first phase relationship between the drive member 16 and the hub 14, and thus between the crankshaft and the camshaft 12. When a change in the phase relationship between the crankshaft and camshaft is desired, the brake assembly 26 is energized to retard the rotation of the drum 20 relative to the hub 14 and against the force of spring 46, such retardation causing the advancing member 18 to rotate relative to the hub, and thus causing it to move axially leftward along the threads as viewed in FIG. 1. As described above, such axial movement of the advancing member causes, by virtue of the engagement of the balls 30 with helical grooves 32 and 34, the drive member to rotate relative to the hub, thus effectively changing the phase relationship between the crankshaft and the camshaft.

The brake assembly 26 comprises housing 56 in the form of an annular channel member, a coil 58 received within the housing, an annular backing plate 60 which is formed of a non-magnetic material and is press fit or staked into the open end of the housing, friction material 62 adhered to the plate 60, and the face of the radially extending portion 23 of the drum 20.

The brake assembly is mounted for limited axial movement relative to the engine by means of a formed sheet metal member 68 welded or otherwise adhered to the housing 56, and having an axially extending tab 70 formed thereon which engages a bracket (not shown) fixed to the engine as described in detail in U.S. Pat. No. 5,031,585.

Engine oil is supplied to the unit by means of a bore 74 formed in the fastener 24, a crossbore 75, and a radial port 76 formed in the shaft 22.

In accordance with the invention, the interfitting tabs and slots of the prior art structures are replaced by a ball and helical slot configuration. Referring to FIGS. 1 and 3, the advancing plate 18 has a plurality of radial holes formed therethrough to receive the balls 30. The holes are sized to permit the balls to roll freely therein, and in accordance with a preferred embodiment of the invention, three such holes are distributed about the periphery of the advancing plate. It can be appreciated, however, that additional holes and balls can be provided if additional load-carrying capability is required. As described above, the balls are received in helical grooves formed on the inside diameter of the input member 16 and on the outside diameter of the hub 14 such that when the advancing plate 18 moves axially when the brake is energized the action of the balls in the grooves causes the hub to be displaced angularly with respect to the input member to produce the desired phase change. It can be appreciated that within the scope of the invention one of the grooves 32 or 34 can be axially disposed while the other is angled or helical.

Referring to FIGS. 2 and 3, the balls 36 supporting the input member are inserted through slots 41 formed in the hub and retained by the retainer 40 which is held in position by a retaining ring 42 received in an annular slot formed in the hub. The retainer 40 (shown in FIG. 2 with retaining ring 42 removed for clarity) comprises an inner ring portion 43, three radial spokes 48 extending radially outwardly from the inner ring, and an outer ring portion 49 which is broken in three places 120° apart to define fingers 50 which are bent outwardly at their ends to retain the balls 36.

When the unit is assembled, the balls 36 are inserted through the slots 41 and into the peripheral grooves 38 and 39. The balls and the retainer 40 are then positioned so that the spokes 48 of the retainer fit into the slots 41 and the balls are received between the fingers 50 in the retainer. The retaining ring 42 is then inserted to the hub to secure the retainer 40. In accordance with the preferred embodiment of the invention, nine balls 36 are used in sets of three; however, it is apparent that additional or fewer balls can be used depending on load conditions. Referring to FIGS. 1 and 2, it can be seen that the balls 36 serve as a bearing between the input member 16 and the hub 14, and also serve as a means to maintain the axial position of the hub with respect to the input member.

I claim:

1. In a phase change device comprising an output member, an input member, bearing means supporting said input member for rotation on said output member, an advancing member received between said input and output member and being operative upon axial movement thereof to effect limited relative rotation between the input and output member, drum means engaged with said advancing member to effect said axial movement of said advancing member when a retarding force is applied to said drum means, and actuating means operable to apply said retarding force; the improvement wherein said bearing means comprises a first peripheral groove formed in said input member, a second peripheral groove formed in said output member, and a plurality of balls received in said first and second grooves.

2. Apparatus as claimed in claim 1, including first retaining means engaged with said output member and effective to maintain said balls in a predetermined angular relationship to one another.

3. Apparatus as claimed in claim 2 wherein said balls are received in said grooves and retained by said first retaining means in a plurality of equally angularly spaced locations.

4. Apparatus as claimed in claim 3 in which said balls are received in three locations 120 degrees apart.

5. Apparatus as claimed in claim 4 in which said balls are received in groups of two or more balls at each location.

6. Apparatus as claimed in any of claims 1 through 5, including one or more radial depressions formed in said output member and intersecting said second peripheral groove to facilitate the insertion of said balls into said peripheral groove, said first retaining means including radially extending elements interfitting with said radial depressions.

7. Apparatus as claimed in claim 6 in which said first retaining means comprises a relatively thin member comprising a first circular portion, said radially extending elements extending outward from said circular portions; and arcuately arranged finger elements extending from each of said radially extending portions.

8. Apparatus as claimed in claim 7 including second retaining means engageable with said output member and being effective to maintain said first retaining means in engagement with said output member.

* * * * *